ized with hydrochloric acid.

UNITED STATES PATENT OFFICE.

HEINRICH JORDAN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

TRISAZO DYE.

No. 920,151.　　　Specification of Letters Patent.　　Patented May 4, 1909.

Application filed January 28, 1909. Serial No. 474,803.

*To all whom it may concern:*

Be it known that we, HEINRICH JORDAN and WILHELM NEELMEIER, doctors of philosophy, chemists, citizens of the German Empire, residing at Leverkusen, near Cologne, Germany, have invented new and useful Improvements in new Trisazo Dye, of which the following is a specification.

Our invention relates to the manufacture and production of new trisazo dyestuffs capable of dyeing unmordanted cotton. The process for their production consists in combining diazo compounds of the benzene or naphthalene series with suitable amins to produce intermediate compounds which can be further diazotized, diazotizing the intermediate compounds thus obtained and combining the diazoazo compounds thus produced again with suitable amins (the same or a different amin may be used), rediazotizing the disazo dyestuffs thus obtained and then combining them with one molecule of a monoacidylized meta-diamin in which the hydrogen in the benzene nucleus in para position to the non-substituted amino group has not been replaced by other groups *e. g.* 4-acetyl-amino-2-aminotoluene, 4-acetylamino-2-aminoanisol, 1-monoacetyl-amino-3-aminobenzene, 4-acetylamino-2-aminobenzene sulfonic acid, 4-acetylamino-2-amino-1-phenetol, 4-acetyl-amino-2-amino-1-chlorobenzene, 4-acetylamino-2-amino-1-phenyl-ether etc.

The new dyestuffs thus obtained are in the shape of their alkaline salts dark powders soluble in water. Upon reduction with zinc dust and acetic acid they are decomposed amins, diamins and monoacidylized triamins being formed. They dye unmordanted cotton generally from violet to blue shades. The dyes can be diazotized on the fiber and further combined with amins or phenols. If, for instance combined with beta-naphthol, they generally produce pure blue shades fast to washing and to light, which on being discharged with hydrosulfites leave a pure white.

In order to carry out this process we can *e. g.* proceed as follows, the parts being by weight:

Example: 173 parts of ortho-sulfanilic acid are diazotized in the usual way and the resulting diazo compound is added to 223 parts of 1-naphthylamin-6-sulfonic acid being suspended in water. After the addition of sodium acetate to neutralize the free mineral acid it is stirred until the combination is finished. Subsequently the mass of the reaction is acidulated with 350 parts of hydrochloric acid (19° Bé.) and the aminoazo compound is diazotized by means of 69 parts of sodium nitrite. The diazo compound separates partly, it is completely precipitated by the addition of common salt and filtered off and is then stirred up with water to a paste and added at 10° C. to a solution of 223 parts of 1-naphthylamin-7-sulfonic acid containing an excess of sodium carbonate. When the reaction is finished the dyestuff is salted out and filtered off. After resolution in water it is diazotized at 0° C. by adding to the solution a solution of 69 parts of sodium nitrite and then by acidulation with hydrochloric acid. The diazo compound separates as a black precipitate which is filtered off, stirred up with ice water and combined with a solution of 180 parts of 4-acetylamino-2-aminoanisol in hydrochloric acid and sodium acetate is added to neutralize the free mineral acid. The dyestuff separates. Sodium carbonate is then added to render the mixture alkaline and the dyestuff is salted out and filtered off. It is, after being dried and pulverized, in the shape of its sodium salt a dark powder soluble in water with a violet color and soluble in concentrated sulfuric acid with a blue color. By reduction with zinc dust and acetic acid, ortho-sulfanilic acid, diaminonaphthalene-6- and 7-sulfonic acid and 1-acetyl-amino-3.6-diamino-4-methoxybenzene are obtained. It dyes unmordanted cotton reddish-blue shades, and produces, when diazotized on the fiber and combined with beta-naphthol, pure greenish-blue shades fast to washing and to light, which can be discharged pure white with hydrosulfite.

The process is carried out in an analogous manner on using other diazo compounds as initial components *e. g.* meta-sulfanilic acid, anilin-2.4-disulfonic acid, 4-chloranilin-2- or 3-sulfonic acid, aminosulfosalicylic acid, 2-naphthylamin-4.8- or 5.7-disulfonic acid, 1-naphthylamin-4.8-disulfonic acid, other amins as middle components, such as the naphthylamins, cresidins, xylidins or other of the above mentioned end components.

Two different middle components may be used e. g. alpha-naphthylamin and 1-naphthylamin-6- or 7-sulfonic acid.

Having now described our invention and in what manner the same is to be performed, what we claim as new and desire to secure by Letters Patent is:—

1. The herein-described new trisazo dyestuffs obtainable from amins, two middle components and monoacidylized meta-diamins in which the hydrogen in the benzene nucleus in para position to the non-substituted amino group has not been replaced by other groups, which dyestuffs are, after being dried and pulverized, in the shape of their alkaline salts dark powders soluble in water, yielding upon reduction with zinc dust and acetic acid amins, diamins and acidyl-triamins, and dyeing cotton from violet to blue shades; which after diazotation on the fiber and combination with beta-naphthol generally change into blue shades fast to washing leaving after being discharged with hydrosulfite a pure white, substantially as described.

2. The herein-described new azo dyestuff which can be obtained from ortho-sulfanilic acid, 1-naphthylamin-6-sulfonic acid, 1-naphthylamin-7-sulfonic acid and 4-acetylamino-2-aminoanisol, which dyestuff is, after being dried and pulverized, in the shape of its sodium salt a dark powder which is soluble in water with a violet color, and which is soluble in concentrated sulfuric acid with a blue color; yielding upon reduction with zinc dust and acetic acid, ortho-sulfanilic acid, diaminonaphthalene-6- and 7-sulfonic acid and 1-acetylamino-3.6-diamino-4-methoxybenzene; dyeing cotton reddish-blue shades which after diazotation on the fiber and combination with beta-naphthol change into pure greenish-blue shades fast to washing and leaving after being discharged with hydrosulfite a pure white, substantially as described.

In testimony whereof we have hereunto set our hands in the presence of two subscribing witnesses.

HEINRICH JORDAN. [L. S.]
WILHELM NEELMEIER. [L. S.]

Witnesses:
OTTO KÖNIG,
WM. WASHINGTON BRUNSWICK.